US006734860B1

(12) United States Patent
Potter et al.

(10) Patent No.: US 6,734,860 B1
(45) Date of Patent: May 11, 2004

(54) APPARATUS FOR PROVIDING VIDEODRIVING CAPABILITY FROM VARIOUS TYPES OF DACS

(75) Inventors: Michael Potter, Huntsville, AL (US); Clifford A. Whitmore, Huntsville, AL (US)

(73) Assignee: 3Dlabs, Inc., Ltd., Hamilton (BM)

( * ) Notice: Subject to any disclaimer, the term of this patent is extended or adjusted under 35 U.S.C. 154(b) by 665 days.

(21) Appl. No.: 09/632,447

(22) Filed: Aug. 4, 2000

Related U.S. Application Data

(60) Provisional application No. 60/147,699, filed on Aug. 6, 1999.

(51) Int. Cl.[7] .......................... G06F 15/00; G06F 1/00

(52) U.S. Cl. ...................................... 345/501; 345/600

(58) Field of Search ................................ 345/501, 519, 345/530, 546, 547, 589, 591, 600–605, 204, 690, 157, 160

(56) References Cited

U.S. PATENT DOCUMENTS 5,227,863 A 7/1993 Bilbrey et al. ................ 358/22
5,442,379 A 8/1995 Bruce et al. ................ 345/199
5,559,954 A * 9/1996 Sakoda et al. .............. 345/546
5,703,622 A * 12/1997 Evans et al. ................ 345/603
5,808,630 A * 9/1998 Pannell ........................ 345/546
5,821,918 A 10/1998 Reinert et al. .............. 345/154
5,943,064 A * 8/1999 Hong .......................... 345/546
6,177,946 B1 * 1/2001 Sinclair et al. ............. 345/501

* cited by examiner

*Primary Examiner*—Kee M. Tung
(74) *Attorney, Agent, or Firm*—Arnall Golden Gregory LLP

(57) ABSTRACT

An apparatus for processing a graphical data stream for display on a display device includes a processor, a first conversion module and a second conversion module. The processor determines the characteristics of the graphical data stream. The first conversion module and the second conversion module convert the graphical data stream in a first format to a second format. The graphical data stream is directed to the first conversion module by a first data path and the graphical data stream is directed to the second conversion module by a second data path. A switching system is used to alternately connect the first conversion module through the first data path and the second conversion module through the second data path.

14 Claims, 6 Drawing Sheets

APPARATUS FOR PROVIDING VIDEODRIVING CAPABILITY FROM VARIOUS TYPES OF DACS

PRIORITY

This application claims priority from U.S. provisional patent application serial No. 60/147,699 filed Aug. 6, 1999, entitled "APPARATUS FOR PROVIDING VIDEODRIVING CAPABILITY FROM VARIOUS TYPES OF DACS," the disclosure of which is incorporated herein, in its entirety, by reference.

FIELD OF THE INVENTION

The invention generally relates to computer graphics processing and, more particularly, the invention relates to graphics accelerators having videodriving capability from various types of digital to analog converters ("DACs").

BACKGROUND OF THE INVENTION

Many computer systems utilize graphics accelerators to process graphics request code. A graphics accelerator may include one or multiple parallel processors. In order to display a graphical image, the data produced by the processor (or processors) must be transmitted to a display device. Accordingly, graphics processors typically utilize a back end system to format the processed graphics request code to be displayed on a display device such as a cathode ray tube monitor. Such formatting may include gamma correction to compensate for,nonlinear characteristics of the drive electronics of the monitor, the addition of cursor data and the conversion of digital graphics data to analog graphics data. Accordingly, back end systems commonly include a random access memory/digital to analog converter ("RAMDAC") that applies gamma correction and adds cursor data to processed graphics request code. It is possible, however, that the internal RAMDAC of the back end system may not function acceptably or meet the requirements of the graphics processing system. Often, the result is that a particular graphics processor will no longer be useable.

SUMMARY OF THE INVENTION

In accordance with one aspect of the invention, an apparatus for processing a graphical data stream for display on a display device includes a processor for determining display characteristics of the graphical data stream, a first conversion module for converting the graphical data stream in a first format to a second format, and a second conversion module for converting the graphical data stream in a first format to a second format. A first data path directs the graphical data stream through the first conversion module and a second data path directs the graphical data stream through the second conversion module. To that end, in a preferred embodiment, the apparatus further includes a switching system for alternatively connecting the first conversion module through the first data path and the second conversion module through the second data path.

In preferred embodiments, the first conversion module and the second conversion module may include a gamma correction module that applies gamma correction operations to the graphical data stream, a cursor unit that adds cursor data to the graphical data stream and a digital to analog converter for converting digital graphical data streams to analog graphical data streams. In addition, the first conversion module and the second conversion module may be formed on different integrated circuits.

In accordance with another aspect of the invention, an apparatus for processing a graphical data stream for display on a display device includes a processor for determining display characteristics of the graphical data stream, a conversion module which includes a first digital to analog converter, the conversion module for converting the graphical data stream in a first format to a second format. The apparatus also includes a second digital to analog converter coupled to the input of the conversion module. A first data path directs the graphical data stream through the first digital to analog converter and a second data path directs the graphical data stream through the second digital to analog converter. To that end, in a preferred embodiment, the apparatus includes a switching system that alternatively connects the first digital to analog converter through the first data path and the second digital to analog converter through the second data path.

In accordance with another aspect of the invention, a graphics processor for processing a graphical data stream for display on a display device includes a back end unit for formatting the graphical data stream for display on the display device. The back end unit includes a first conversion module for converting the graphical data stream in a first format to a second format. The processor also includes a second conversion module coupled to the first conversion module input. The second conversion module converts the graphical data stream which is in a first format to a second format. A first data path, coupled with the first conversion module input and the display device, directs the graphical data stream through the first conversion module and a second data path, coupled with the first conversion module and the display device, directs the graphical data stream through the second conversion module.

In one embodiment, the first conversion module and the second conversion module include a gamma correction module for applying gamma correction operations to the graphical data stream, a cursor unit for adding cursor data to the graphical data stream and a digital to analog converter for converting digital graphical data streams into analog graphical data streams. In addition, the first conversion module and the second conversion module may be formed on different integrated circuits.

In a further embodiment, the graphics processor further includes a switching system coupled to the first conversion module and the second conversion module. The switching system alternately connects the first conversion module through the first data path and the second conversion module through the second data path.

In accordance with yet another aspect of the invention, a graphics processor for processing a graphical data stream for display on a display device includes a back end unit for formatting the graphical data stream for display on the display device. The back end unit includes a conversion module which includes an input for receiving the graphical data stream, a first digital to analog converter for converting digital graphics data streams into analog graphics data streams and an output for transmitting the graphical data stream to the display device. The graphics processor also includes a second digital to analog converter coupled to the input of the conversion module. The second digital to analog converter converts digital graphics data streams to analog graphics data streams. A first data path, coupled to the input of the conversion module and the display device, directs the graphics data stream through the first digital to analog converter and a second data path, coupled with the input of the conversion module and the display device, directs the graphical data stream through the second digital to analog converter.

In one embodiment, the conversion module also includes a gamma correction module for applying gamma correction operations to the graphical data stream and cursor unit for adding data to the graphical data stream. A switching system may be coupled to the first digital to analog converter and the second digital to analog converter. The switching system alternately connects the first digital to analog converter through the first data path and the second digital to analog converter through the second data path. In a further embodiment, the first digital to analog converter and the second digital to analog converter are formed on different integrated circuits.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
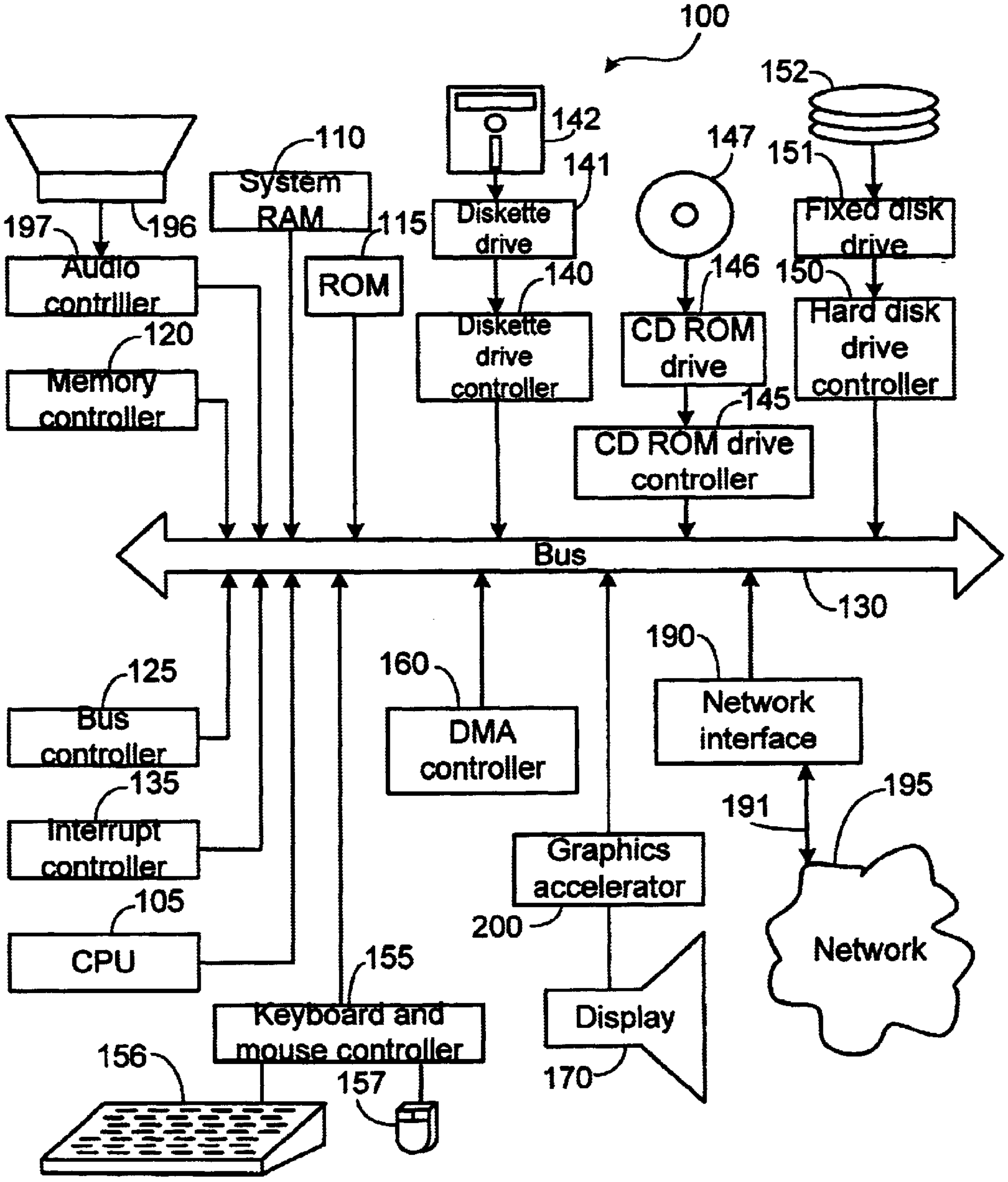
FIG. 1 schematically shows the system architecture of an exemplary computer system on which preferred embodiments of the invention may be implemented.

FIG. 1 illustrates the system architecture for an exemplary computer system 100, such as an Intergraph EXTREME-Z™ graphics workstation (distributed by Intergraph Corporation of Huntsville, Ala.), on which the disclosed apparatus for providing videodriving capability from various types of digital to analog converters may be implemented. The exemplary computer system of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1.

The computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the computer system 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 130 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a graphics accelerator 200 (discussed in detail below) that controls a display device 170. The display device 170 preferably is a conventional horizontal scan cathode ray tube ("CRT") monitor having a plurality of pixels. The pixels are arranged in a two-dimensional X-Y grid and are selectively lit, as directed by the graphics accelerator 200, for displaying an image. The display device 170 may be, for example, an IBM G72 General Series Monitor, distributed by International Business Machines Corporation of Armonk, N.Y.

A network adapter 190 also may be included that enables the computer system 100 to connect to a network 195 via a network bus 191. The network 195, which may be a local area network (LAN), a wide area network (WAN), or the Internet, may utilize general purpose communication lines that interconnect a plurality of network devices.

The computer system 100 preferably is controlled and coordinated by operating system software, such as the WINDOWS NT® operating system (available from Microsoft Corp., of Redmond, Wash.). Among other computer system control functions, the operating system controls allocation of system resources and performs tasks such as process scheduling, memory management, networking, and I/O services.

Figure 2A:
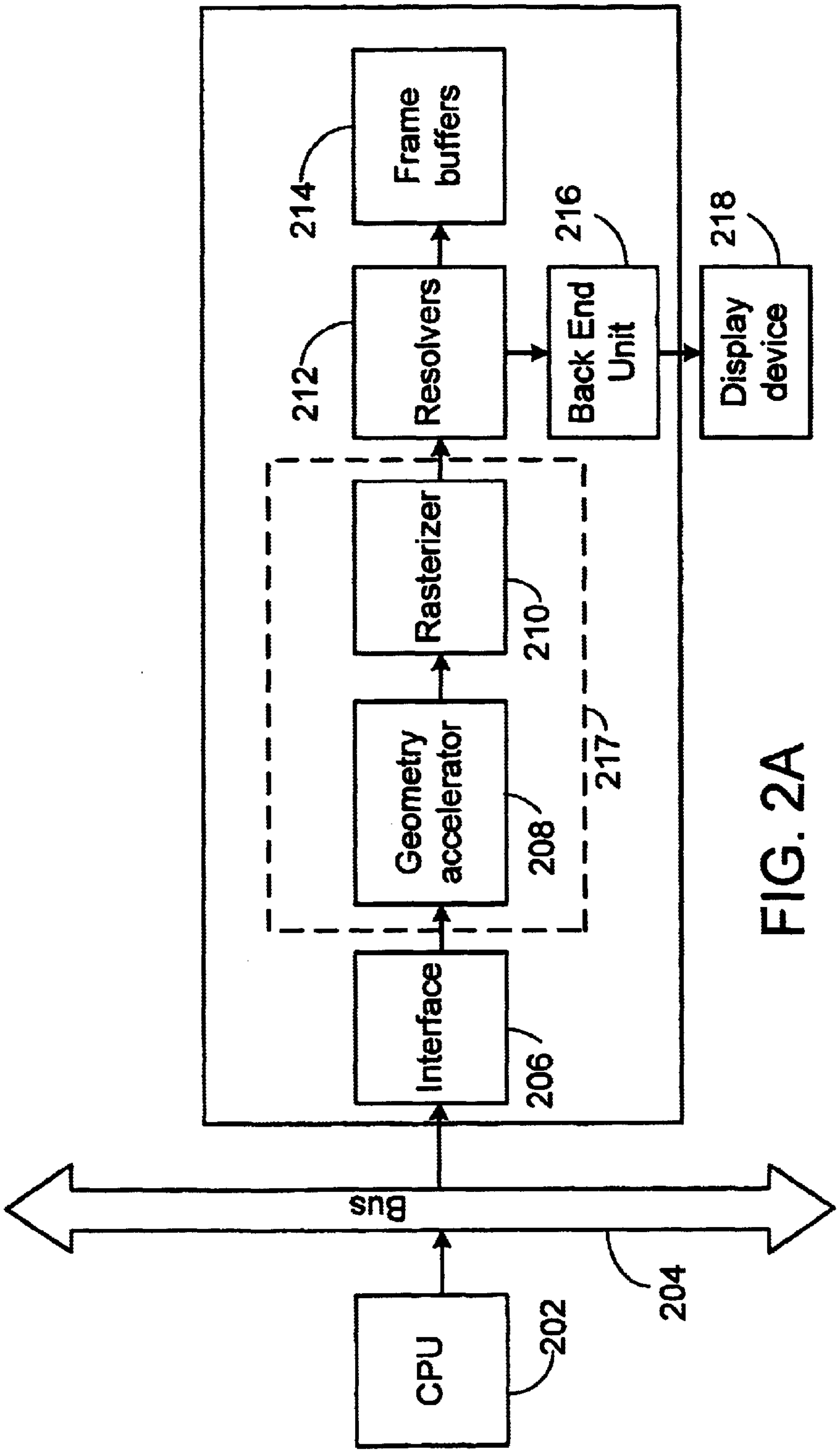
FIG. 2A schematically shows a graphics accelerator with a graphics processor and back end module configured in accordance with preferred embodiments of the invention.
Figure 2B:
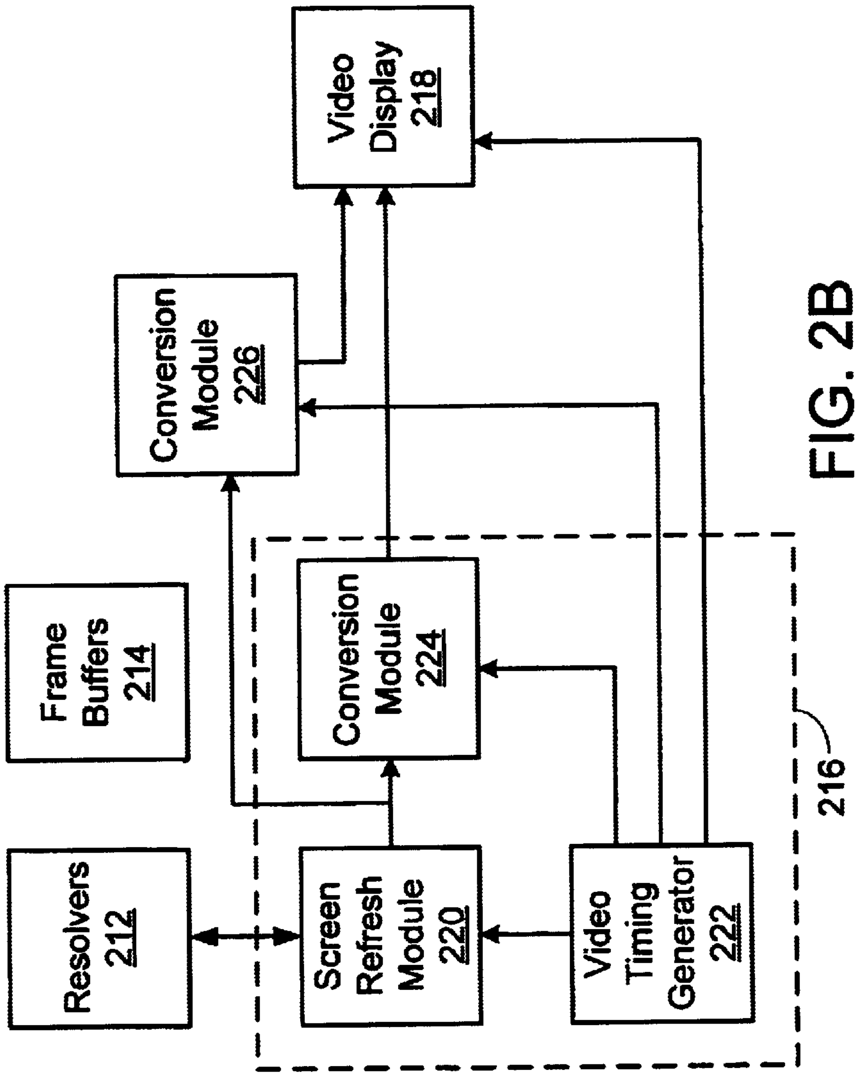
FIG. 2B schematically shows a back end module with an external random access memory digital to analog converter in accordance with a preferred embodiment of the invention.
Figure 2C:
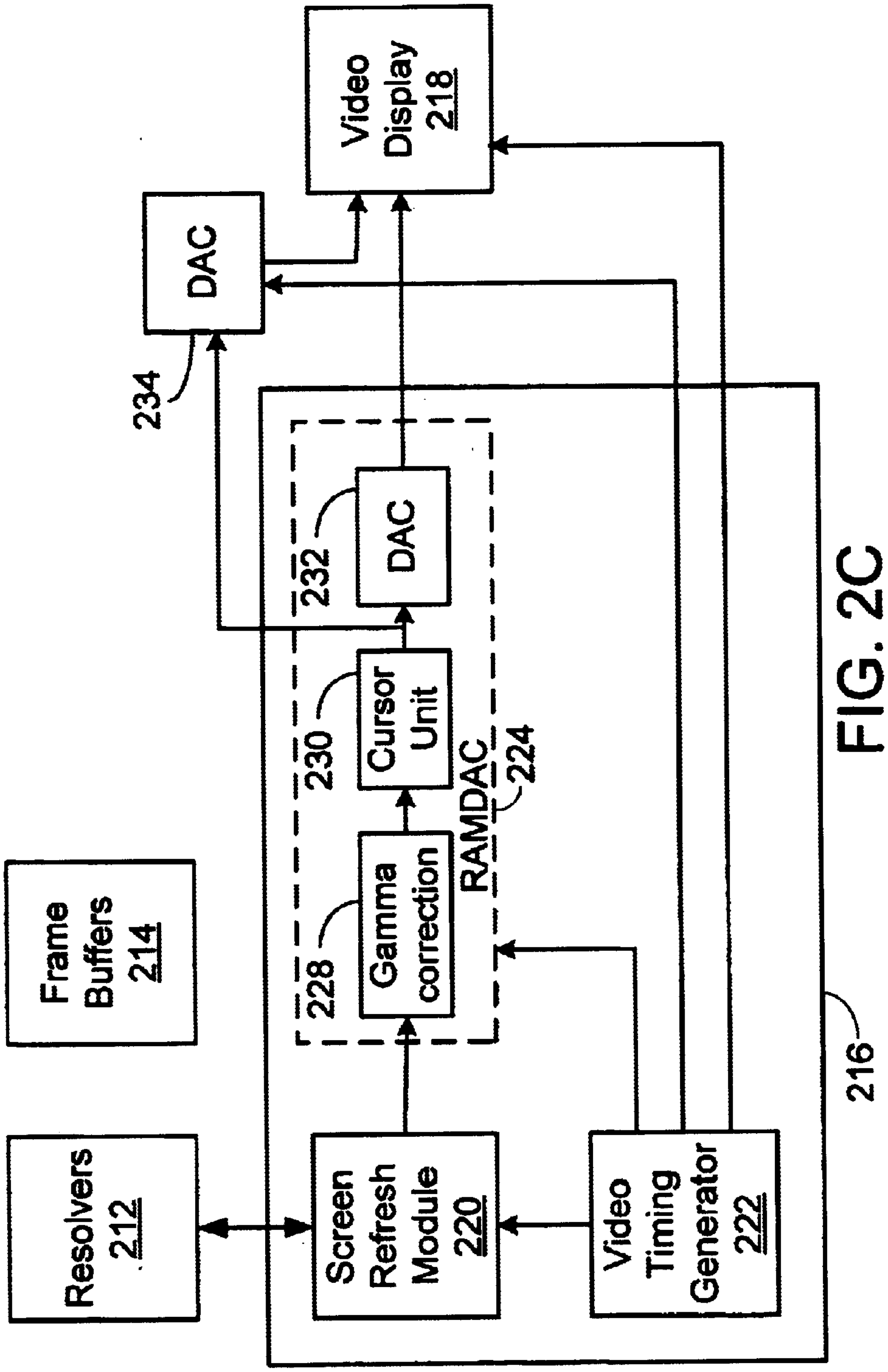
FIG. 2C schematically shows a back end module with an external digital to analog converter in accordance with a preferred embodiment of the invention.

FIGS. 2A, 2B and 2C schematically show the graphics accelerator 200 configured in accordance with preferred embodiments of the invention. The exemplary graphics accelerator 200 in FIG. 2A has a geometry accelerator 208 and a rasterizer 210. As discussed in greater detail below with respect to FIG. 3A and 3B, in an alternative embodiment of the invention the graphics accelerator 200 preferably includes a plurality of parallel processing units that divide the graphics processing in an efficient manner among processors. Accordingly, graphics request streams may be more rapidly processed for display by the display device.

The graphics accelerator 200 preferably includes a bus interface 206 for interfacing with the system bus 204, and a processing unit 217 for processing the graphics request stream. The processing unit 217 preferably processes three dimensional ("3D") graphical images as a plurality of individual triangles defined in 3D space. As known in the art, this method of processing 3D graphical images is known as "tessellation." The plurality of processing units receives incoming triangle vertex data and, based upon such vertex data, ultimately draws each triangle on the display device. The incoming vertex data for a given vertex preferably includes the X, Y, and Z coordinate data for the given vertex (identifying the location of the vertex in 3D space), and three directional vector components ("normal vectors") that are perpendicular to the surface of the triangle at that given vertex.

Accordingly, the processing unit 217 preferably include a geometry accelerator 208 that receives the incoming triangle vertex data from the bus interface 206 and, based upon such incoming data, calculates attribute data (e.g., color data, depth data, transparency data, intensity data, coordinates of the vertices on the display device, etc . . .) for each of the vertices in the triangle. The geometry accelerator may be similar to that disclosed in copending U.S. patent application entitled, "WIDE INSTRUCTION WORD GRAPHICS PROCESSOR," filed on Jul. 15, 1999 as Ser. No. 09/353,420, the disclosure of which is incorporated herein, in its entirety, by reference.

Once calculated by the geometry accelerator 208, the vertex attribute data is transmitted to rasterizer 210. Rasterizer 210 calculates pixel attribute data for select pixels within a triangle based upon the vertex attribute data. In preferred embodiments, the rasterizer 210 may be similar to that disclosed in copending U.S. patent application entitled, "MULTI-PROCESSOR GRAPHICS ACCELERATOR," filed on Jul. 15, 1999 as Ser. No. 09/354,462, the disclosure of which is incorporated herein, in its entirety, by reference. A plurality of resolvers 212 then stores the resultant attribute data for each pixel in one of a plurality of frame buffers 214. Each frame buffer 214 preferably is a double-buffered, sixteen megabyte frame buffer 214 having a back buffer and a front buffer. Accordingly, the contents of the front buffer is displayed by the display device while the resolver 212 is writing to the back buffer. Conventional buffer swaps enable the contents of the back buffer to be displayed. To effectuate this, each rasterizer 210 (with its associated resolvers 212 and frame buffers 214) includes an associated back end unit 216 for removing frame buffer information and displaying it on the display device 218. See, for example, copending U.S. patent application entitled, "Apparatus and Method of Directing Graphical Data to a Display Device", filed on Jul. 15, 1999 as Ser. No. 09/354,462, the disclosure of which is incorporated herein, in its entirety, by reference. Such patent application shows additional details of the back end units 234 that may be utilized in accord with preferred embodiments of the invention.

FIG. 2B schematically shows a preferred back end unit 216 for displaying frame buffer information on the display device 218. Back end unit 216 includes a screen refresh module 220 for retrieving digital frame buffer data from its associated frame buffer 214 via the associated resolvers 212, a conversion module 224 for performing gamma correction, digital to analog conversion, and adding cursor data, and a video timing generator 222 for generating timing signals for each of the aforementioned back end unit 216 elements and the display device 218.

The screen refresh module 220 requests data from the frame buffers 214 via resolvers 212. The data retrieved by the screen refresh module 220 is transmitted through a first data path to conversion module 224. Conversion module 224 is preferably a random access memory digital to analog converter ("RAMDAC"). Conversion module 224 processes the data retrieved from the screen refresh module 220. Such processing preferably includes gamma correction (a.k.a. gamma mapping, which is well known in the art), and digital to analog conversion for display on an (analog) display device. The processed data is then transmitted to display device 218.

As mentioned above, it is possible that the internal conversion module 224 of back end unit 216 may not function acceptably or meet the requirements of the graphics accelerator 200. For example, the size of the look up tables used by the gamma correction module 228 (FIG. 2C) may no longer be adequate. In accordance with preferred embodiments of the invention, a second external conversion module 226 may be provided which advantageously provides the desired capabilities. External conversion module 226 is preferably a random access memory digital to analog converter ("RAMDAC"). In a preferred embodiment, conversion module 226 is formed on a separate integrated circuit from back end unit 217. In addition, conversion module 226 may also be utilized if the internal conversion module 224 is not functioning acceptably. In a preferred embodiment, conversion module 226 performs processing on the graphical data stream including gamma correction and digital to analog conversion.

As shown in FIG. 2B, a second data path for the graphical data stream is created by coupling the input of the external conversion module 226 with the input of the internal conversion module 224 and the output of the external conversion module 226 with the display device 218. In this manner, a second data path is provided for the graphical data stream to be transmitted to the display device 218 through external conversion module 226. Accordingly, back end unit 216 preferably includes a switching system to alternatively connect the output of screen refresh module 220 with the first data path through internal conversion module 224 and the second data path through external conversion module 226. When the second data path through external conversion module 226 is selected (i.e., turned "on"), the graphical data stream does not pass through the internal conversion module 224. In other words, when the second data path is selected, the first data path is turned "off" such that the internal conversion module 224 is bypassed and the graphical data stream passes through external conversion module 226 to the display device 218. The graphical data stream is processed by the conversion module through which it passes.

In a preferred embodiment, back end unit 216 includes a register (not shown) which is used to control the selection of internal conversion module 224 or external conversion module 226. The register receives a code which sets the state of the back end unit 216 to either utilize the first data path through internal conversion module 224 or the second data path through external conversion module 226.

FIG. 2C shows an alternative embodiment of the invention in which a second data path to an external digital to analog converter ("DAC") is provided. As discussed above, internal conversion module 224 preferably includes a gamma correction module 228 to perform gamma correction, a cursor unit 230 to add cursor data to the graphical data and a digital to analog converter 232. In one mode of operation, data retrieved by the screen refresh module 220 is transmitted to internal conversion module 224 where it is processed by the gamma correction module 228, the cursor unit 230 and the digital to analog converter 232. A first data path is provided between the output of the cursor unit 230 and the input of digital to analog converter 232 of the internal conversion module. The graphical data stream processed by internal conversion module 224 is transmitted to display device 218.

In accordance with an embodiment of the invention, in another mode of operation, the digital to analog converter 232 of internal conversion module 224 may be selectably bypassed by providing a second data path between the output of cursor unit 230 and an input of an external digital to analog converter 234. In a preferred embodiment, digital to analog converter 234 is formed on a separate integrated circuit than back end unit 216. Back end unit 216 preferably includes a switching system to alternatively connect the output of the cursor unit 230 to the first data path through the internal digital to analog converter 232 and the second data path through the external digital to analog converter 234. When the second data path through external digital to analog converter 234 is selected (i.e., turned "on"), the graphical data stream does not pass through the internal digital to analog converter 232. Instead, the graphical data will pass through the gamma correction module 228, cursor unit 230 and then through the second data path to the external digital converter 234. The output of the external digital to analog converter 234 is preferably connected to the display device 218. As discussed above, back end unit 216 preferably includes a register (not shown) to control the selection of internal digital to analog converter 232 or the external digital to analog converter 234.

Figure 3A:
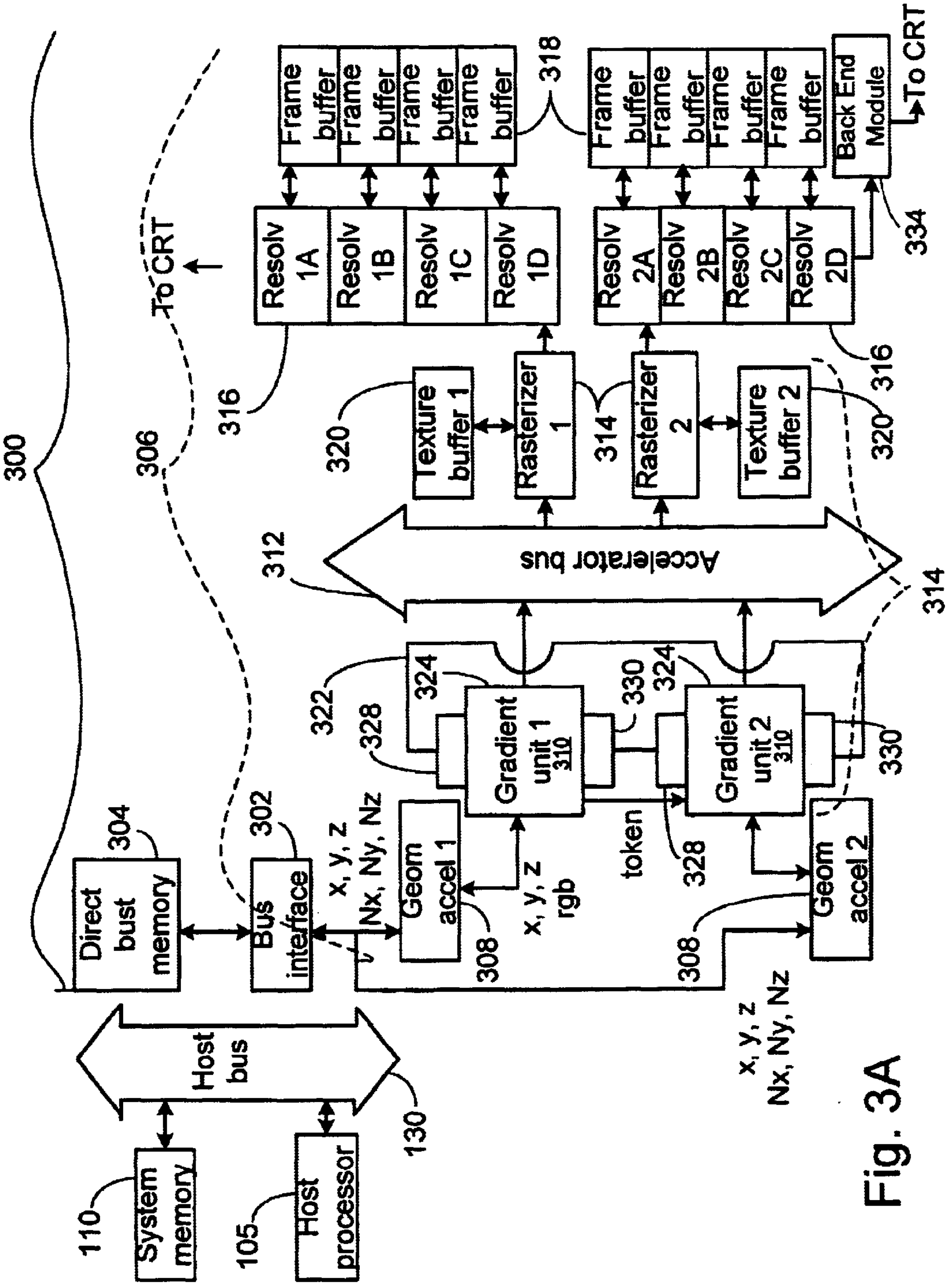
FIG. 3A schematically shows a graphics accelerator having a plurality of parallel data processing units configured in accordance with an alternative embodiment of the invention.
Figure 3B:
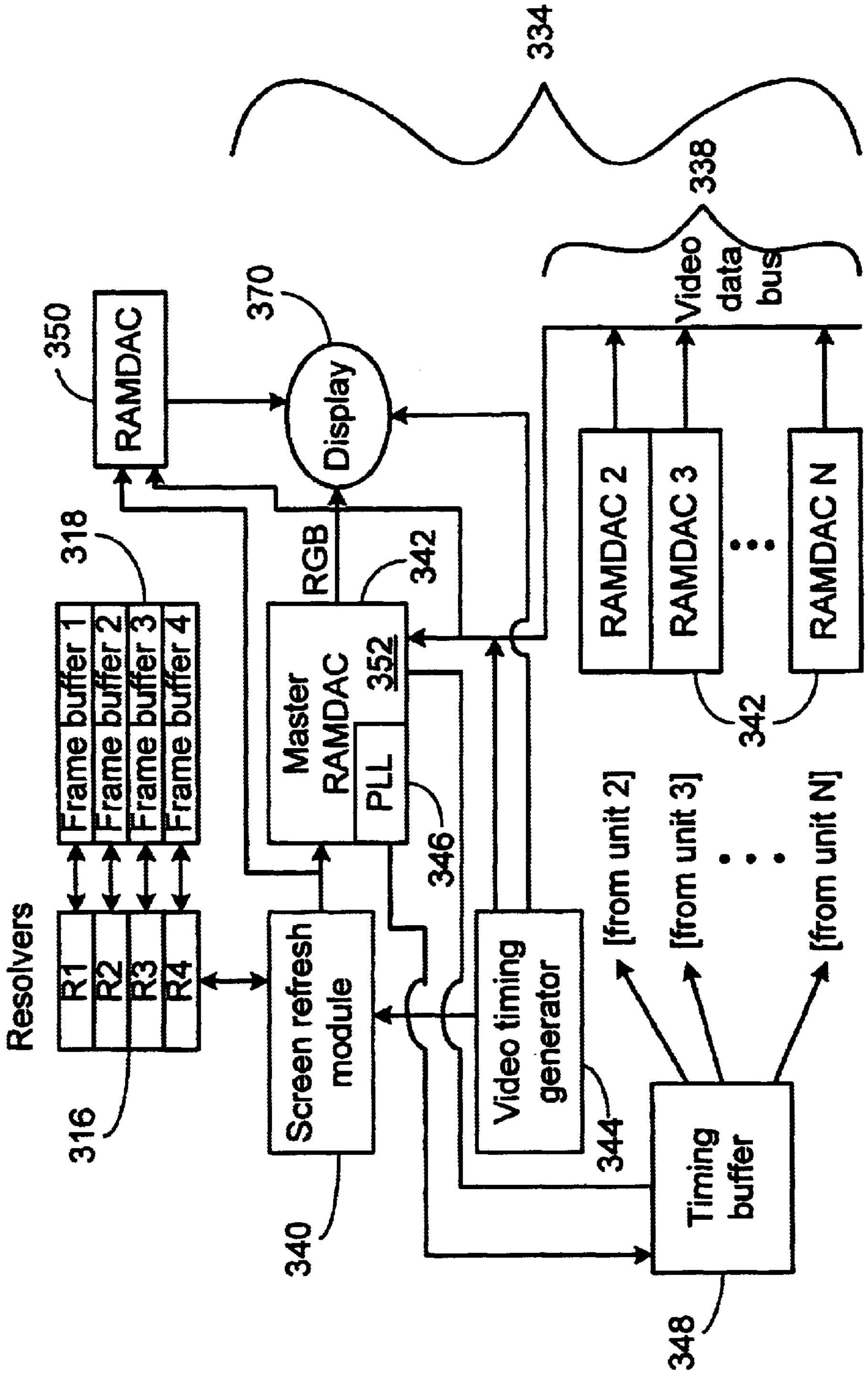
FIG. 3B schematically shows a set of back end modules with an external random access memory digital to analog converter for use with the plurality of graphics processors of FIG. 3A in accordance with an alternative embodiment of the invention.

As discussed above, the graphics accelerator preferably includes a plurality of parallel processing units. FIGS. 3A and 3B show a graphics accelerator having a plurality of parallel processing units configured in accordance with an alternate embodiment of the invention. In FIG. 3A, the exemplary graphics accelerator 300 has two geometry accelerator processors 308 and two post geometry accelerator processors (i.e., two rasterizer/gradient unit pairs, referred to herein as attribute processors 314). Of course, because two of each type of processor are discussed for simplicity, it should be apparent to those skilled in the art that additional or fewer processors may be utilized. Additional information on a preferred graphics accelerator with multiple processors is disclosed in copending U.S. patent application entitled, "MULTI-PROCESSOR GRAPHICS ACCELERATOR", filed on Jul. 15, 1999 as Ser. No. 09/354,462, the disclosure of which has been incorporated by reference above.

FIG. 3B shows a set of back end modules for use with the multiple processors of FIG. 3A for displaying frame buffer information on the display device 370. The set of back end units 334 includes a master back end unit 336 and a plurality of slave back end units 338. Among other things, the master back end unit 336 includes a screen refresh module 340 for retrieving digital frame buffer data from its associated frame buffer 318 via the associated resolvers 316, a master RAMDAC 342 for performing gamma correction and digital to analog conversion, and a video timing generator 344 from generating timing signals for each of the aforementioned master back end unit 236 elements and the display device 370. The data retrieved by the screen refresh module 340 is transmitted through a first data path to a first input 352 of the master RAMDAC 342.

Each of the slave back end units 338 similarly includes a screen refresh module 340, a RAMDAC 342 and a video timing generator 344. The RAMDAC of each slave unit 338 preferably is coupled to a second input 354 of the master RAMDAC 342 through a second data path. This coupling may be either via a direct input into the master RAMDAC 342, via a single video bus, or serially via other slave RAMDACs 342. As shown below, in preferred embodiments, only the video timing generator 344 of the master back end unit 336 is coupled to with the display device 370. Each screen refresh module 340 is coupled to its associated set of resolvers 316 for retrieving data from its associated frame buffer 318. Only one set of resolvers 316, however, is shown in FIG. 3B. That set of resolvers 316 is associated with the master back end unit 336.

In accordance with an embodiment of the invention, a bypass of the master RAMDAC 342 is provided to an external RAMDAC 350. The inputs of the external RAMDAC 350 are coupled to the inputs 352 and 354 of the master RAMDAC 342 and the output of external RAMDAC 350 is coupled to the display device 370. The operation of the bypass path of master RAMDAC 342 to external RAMDAC 350 is similar to that described above with respect to FIG. 2B. In accordance with an alternative embodiment of the invention, a bypass of the digital to analog converter of master,RAMDAC 342 may be provided to an external digital to analog converter. The operation of the bypass of the internal digital to analog converter of master RAMDAC 342 is similar to that discussed above with respect to FIG. 2C.

Although various exemplary embodiments of the invention have been disclosed, it should be apparent to those skilled in the art that various changes and modifications can be made which will achieve some of the advantages of the invention without departing from the true scope of the invention. These and other obvious: modifications are intended to be covered by the appended claims.

We claim:

1. An apparatus for processing a graphical data stream for display on a display device, the apparatus comprising:

a processor for determining display characteristics of the graphical data stream, the processor having an output;

a first conversion module having an input for receiving the graphical data stream from the processor and an output for transmitting the graphical data stream to the display device, the first conversion module converting the graphical data in a first format to a second format;

a second conversion module having an input for receiving the graphical data stream from the processor and an output for transmitting the graphical data stream to the display device, the second conversion module converting the graphical data stream in a first format to a second format;

a first data path coupled with the processor output and the display device, the first data path directing the graphical data stream through the first conversion module;

a second data path coupled with the processor output and the display device, the second data path directing the graphical data stream through the second conversion module; and a switching system coupled to the first conversion module and the second conversion module, the switching system being placed between the processor and first and second conversion modules and alternatively directing the graphical data stream through either the first data path or the second data path.

2. An apparatus according to claim 1, wherein the first conversion module includes:

a first gamma correction module for applying gamma correction operations to the graphical data stream;

a first cursor unit for adding cursor data to the graphical data stream; and a first digital to analog converter for converting digital graphical data streams into analog graphical data streams.

3. An apparatus according to claim 1, wherein the second conversion module includes:

a second gamma correction module for applying gamma correction operations to the graphical data stream;

a second cursor unit for adding cursor data to the graphical data stream; and a second digital to analog converter for converting digital graphical data stream to analog graphical data streams.

4. An apparatus according to claim 1, wherein the first conversion module and the second conversion module are formed on different integrated circuits.

5. An apparatus for processing a graphical data stream for display on a display device, the apparatus comprising:

a. a processor for determining display characteristics of the graphical data stream;

b. a switching system for receiving the graphical data stream from the processor and for directing the flow of the graphical data stream;

c. a conversion module for converting the graphical data stream in a first format to a second format, the conversion module comprising:

i. an input for receiving the graphical data stream from the switching system;

ii. a first digital to analog converter for converting digital graphics data streams into analog graphics data streams; and iii. an output for transmitting the graphical data stream to the display device;

d. a second digital to analog converter coupled to the switching system, the second digital to analog converter converting digital graphics data streams into analog graphics data streams;

e. a first data path coupled with the input of the conversion module and the display device, the first data path directing the graphical data stream through the first digital to analog converter; and f. a second data path coupled with the switching system and the display device, the second data path directing the graphical data stream through the second digital to analog converter, wherein the switching system alternatively directing the flow of the graphical data stream through either the first data path or through the second data path.

6. An apparatus according to claim 5, wherein the conversion module further includes:

a gamma correction module for applying gamma correction operations to the graphical data stream; and a cursor unit for adding cursor data to the graphical data stream.

7. An apparatus according to claim 5, wherein the first digital to analog converter and the second digital to analog converter are formed on different integrated circuits.

8. A graphics processor for processing a graphical data stream for display on a display device, the graphics processor comprising:

a switching system for receiving the graphical data stream and for directing the flow of the graphical data stream;

a back end unit for formatting the graphical data stream for display on the display device, the back end module having a first conversion module, the first conversion module having an input and an output, the input being connected to the switching system, the first conversion module for converting the graphical data stream in a first format to a second format;

a second conversion module coupled to the switching system, the second conversion module converting the graphical data stream in a first format to a second format;

a first data path coupled with the first conversion module input and the display device, the first data path directing the graphical data stream through the first conversion module; and a second data path coupled with the switching system and the display device, the second data path for directing the graphical data stream through the second conversion module;

wherein the switching system alternatively directing the graphical data stream through either the first data path or through the second data path.

9. A graphics processor according to claim 8, wherein the first conversion module comprises:

a first gamma correction module for applying gamma correction operations to the graphical data stream;

a first cursor unit for adding cursor data to the graphical data stream; and a first digital to analog converter for converting digital graphical data streams into analog graphical data streams.

10. A graphics processor according to claim 8, wherein the second conversion module comprises:

a second gamma correction module for applying gamma correction operations to the graphical data stream;

a second cursor unit for adding cursor data to the graphical data stream; and a second digital to analog converter for converting digital graphical data streams into analog graphical data streams.

11. A graphics processor according to claim 8, wherein the first conversion module and the second conversion module are formed on different integrated circuits.

12. A graphics processor for processing a graphical data stream for display on a display device, the graphics processor comprising:

a. a switching system for receiving the graphical data stream and for directing the flow of the graphical data stream;

b. a back end unit for formatting the graphical data stream for display on the display device, the back end unit having a first conversion module, the first conversion module comprising:

i. an input for receiving the graphical data stream from the switching system;

ii. a first digital to analog converter for converting digital graphics data streams into analog graphics data streams;

iii. an output for transmitting the graphical data stream to the display device;

c. a second digital to analog converter coupled to the switching system, the second digital to analog converter converting digital graphics data streams into analog graphics data streams;

d. a first data path coupled with the input of the first conversion module and the display device, the first data path directing the graphical data stream through the first digital to analog converter; and e. a second data path coupled with the switching system and the display device, the second data path directing the graphical data stream through the second digital to analog converter, wherein the switching system alternately directing the graphical data stream through either the first data path or through the second data path.

13. A graphics processor according to claim 12, wherein the conversion module further includes:

a gamma correction module for applying gamma correction operations to the graphical data stream; and a cursor unit for adding cursor data to the graphical data stream.

14. A graphics processor according to claim 12, wherein the first digital to analog converter and the second digital to analog converter are formed on different integrated circuits.

* * * * *